(12) United States Patent
Kiuchi

(10) Patent No.: US 6,535,306 B1
(45) Date of Patent: Mar. 18, 2003

(54) IMAGE READING DEVICE

(75) Inventor: Masayoshi Kiuchi, Shisui-machi (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/328,465

(22) Filed: Jun. 9, 1999

(30) Foreign Application Priority Data

Jun. 24, 1998 (JP) .......................................... 10-192321

(51) Int. Cl.$^7$ ................................................. H04N 1/04
(52) U.S. Cl. ...................... 358/474; 358/486; 358/488; 358/497; 358/482; 358/406
(58) Field of Search ................... 358/474, 471, 358/497, 494, 488, 486, 449, 453, 527, 406, 504, 505, 482, 483

(56) References Cited

U.S. PATENT DOCUMENTS 5,128,778 A * 7/1992 Blitz et al. ................... 358/482
6,295,143 B1 * 9/2001 Lee et al. ................... 358/487

\* cited by examiner

*Primary Examiner*—Cheukfan Lee
(74) *Attorney, Agent, or Firm*—Fitzpatrick, Cella, Harper & Scinto

(57) ABSTRACT

An image reading device includes a control unit for controlling an image reading unit so as to perform a reading operation within a range obtained by adding predetermined widths m and n to a reading range set after prescanning by a setting unit so that the relationship of X2=X1+m and Y2=Y1+n holds at main scanning, where m and n are constants, X1 and Y1 are the lengths of the set reading range in the x-axis and y-axis directions, and X2 and Y2 are the lengths of an actual reading range in the x-axis and y-axis directions, respectively. As a result, it is unnecessary to perform troublesome operations, such as reassigning a reading range, and again performing a reading operation.

23 Claims, 7 Drawing Sheets

FIG.3

| READING RANGE AT MAIN SCANNING | X2,Y2 < MAXIMUM READING WIDTH | X2,Y2 ≥ MAXIMUM READING WIDTH |
|---|---|---|
| X2 | X1+m | Xmax |
| Y2 | Y1+n | Ymax |

X1,Y1 : SET READING RANGE (m,n : CONSTANT)
Xmax,Ymax : MAXIMUM READING RANGE

FIG.4

| READING RANGE AT MAIN SCANNING | X2,Y2 < MAXIMUM READING WIDTH | X2,Y2 ≥ MAXIMUM READING WIDTH |
|---|---|---|
| X2 | X1 (1+p) | Xmax |
| Y2 | Y1 (1+q) | Ymax |

X1,Y1 : SET READING RANGE (p,q : CONSTANT)
Xmax,Ymax : MAXIMUM READING RANGE

MOVING DIRECTION

IMAGE READING DEVICE

BACKGROUND OF THE INVENTION

1. Field of the Invention

The present invention relates to an image reading device having a prescanning function of reading an original in advance and a main scanning function of again reading the original after the prescanning, an image reading method applied to the image reading device, and a storage medium. More particularly, the invention relates to an image reading device which can be applied to a sheet feeding scanner for reading an original by moving it, a scanner in which an original is accommodated within an original-holder and is read together with the original-holder, or the like, and which is suitable when it is intended to assuredly receive an image from within a reading range set after prescanning by correcting the set reading range, an image reading method applied to the image reading device, and a storage medium.

2. Description of the Related Art

In conventional image reading devices, such as sheet feeding scanners and the like, having a prescanning function, in contrast to fixed-original scanners in which a scanning operation is performed by fixing an original, an image on an original is read by moving the original, a reading range in main scanning is assigned after prescanning via a display unit, the original is again set, and main scanning in which the original is read within the assigned reading range is performed. In image reading devices of a type in which a scanning operation is performed while accommodating an original in an original-holder, the original is accommodated in the original-holder and is scanned together with the original-holder.

FIGS. 7A–7D are diagrams, each illustrating an operation of reading an original in a conventional original reading device. In FIG. 7A, there are shown an original to be read 71, and an area A indicating a reading range assigned after prescanning. FIG. 7B illustrates a state in which the set position of the original 71 has laterally shifted to the left, the original 71 has shifted to the right in an original-holder (not shown), or the reading range has shifted to the right. An area B indicates a read range. FIG. 7C illustrates a state in which, when driving and feeding the original 71 to a reading position during main scanning, the original 71 has shifted in a longitudinal direction, or the original 71 within the original-holder has shifted upwardly within the original-holder. An area C indicates a read range. FIG. 7D illustrates a state in which, since the original 71 has not been uniformly driven during main scanning, the original 71 has been obliquely driven or the original 71 within the original-holder has inclined. An area D indicates a read range.

The above-described conventional approach has the following problems. In conventional image reading devices, such as sheet feeding scanners and the like, since a reading range at main scanning is assigned after prescanning, and main scanning in which the assigned range is read is performed after again setting an original, it is necessary to set the original twice in order to perform one image receiving operation. Since, as is shown in FIGS. 7A–7D, the position of the original changes every time the original is set, the set reading range differs, in some cases, from the actual receiving range.

Furthermore, since the surface state of the original is not constant, the frictional force between the driving member and the original changes due to dust and the like adhering to the original-driving roller of the image reading device, thereby producing, in some cases, slip of the original when driving the original. As a result, as shown in FIGS. 7A–7D, the original-reading range changes every time an original is set, thereby causing, in some cases, a difference between the set reading range and the actual receiving range. In addition, in image reading devices of a type in which an original is accommodated in an original-holder and is scanned together with the original-holder, the original moves within the original-holder, resulting in, in some cases, an operation of reading an image in an area different from the assigned area for the original.

SUMMARY OF THE INVENTION

It is an object of the present invention to assuredly receive an image within a main scanning range set after prescanning.

According to one aspect of the present invention, an image reading device having a prescanning function of reading an original in advance and a main scanning function of again reading the original after prescanning includes control means for performing control so as to perform a reading operation within a range wider than a reading range set after prescanning, at main scanning.

According to another aspect of the present invention, an image reading method applied to an image reading device having a prescanning function of reading an original in advance and a main scanning function of again reading the original after prescanning. The method includes a control step of performing control so as to perform a reading operation within a range wider than a reading range set after prescanning, at main scanning.

According to still another aspect of the present invention, in a storage medium, capable of being read by a computer, a program is stored for executing an image reading method applied to an image reading device having a prescanning function of reading an original in advance and a main scanning function of again reading the original after prescanning, the image reading method includes a control step of performing control so as to perform a reading operation within a range wider than a reading range set after prescanning, at main scanning.

According to the present invention, it is possible to assuredly receive an image within a main scanning range set after prescanning.

The foregoing and other objects, advantages and features of the present invention will become more apparent from the following description of the preferred embodiments taken in conjunction with the accompanying drawings.

BRIEF DESCRIPTION OF THE DRAWINGS

FIG. 3 is a table illustrating an example in which reading is performed by widening a reading range at main scanning from a set range by respective predetermined widths in the image reading device of the first embodiment;

FIG. 4 is a table illustrating an example in which reading is performed by widening a reading range at main scanning from a set range by respective predetermined ratios in the image reading device of the second embodiment;

FIG. 7A is a diagram illustrating an original and a reading range assigned after prescanning; FIG. 2B is a diagram illustrating a case in which the position of the original shifts at main scanning; FIG. 7C is a diagram illustrating another case in which the position of the original shifts at main scanning; and FIG. 7D is a diagram illustrating still another case in which the position of the original shifts at main scanning.

DESCRIPTION OF THE PREFERRED EMBODIMENTS

Figure 1:
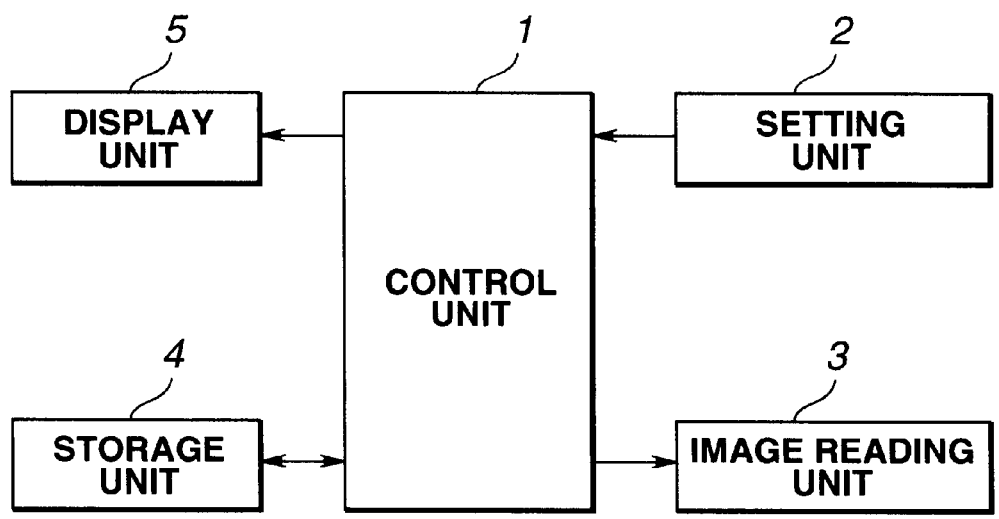
FIG. 1 is a functional block diagram illustrating the configuration of a principal portion of an image reading device applicable to first and second embodiments of the present invention.

FIG. 1 is a functional block diagram illustrating a principal portion of an image reading device according to a first embodiment of the present invention. The image reading device according to the first embodiment has a prescanning function and a main scanning function, and includes a control unit 1, a setting unit 2, an image reading unit 3, a storage unit 4, and a display unit 5. In FIG. 1, other components, such as an original-driving system for driving an original, an image-data storage system for storing image data read from the original, an image processing system for processing the image data read from the original, and the like, are omitted.

In FIG. 1, the control unit 1 controls the image reading unit 3 so as to perform a reading operation within a range obtained by adding predetermined widths m and n to a reading range set by the setting unit 2 after prescanning so that the relationship of X2=X1+m and Y2=Y1+n holds at main scanning, where m and n are constants, X1 and Y1 are the lengths of the set reading range in the x-axis and y-axis directions, and X2 and Y2 are the lengths of an actual reading range in the x-axis and y-axis directions, respectively, at main scanning based on a control program stored in the storage unit 4. The control unit 1 also controls the image reading unit 3 so as to perform a reading operation with respective maximum reading widths when the lengths X2 and Y2 exceed the corresponding maximum reading widths of the image reading unit 3. The predetermined widths m and n are set to values smaller than the lengths X1 and Y1, respectively.

The setting unit 2 is operated when setting the reading range by the image reading unit 3. The image reading unit 3 reads an image from an original. The storage unit 4 stores control programs to be executed by the control unit 1, and data set by the setting unit 2. The display unit 5 can display the reading range, and can assign a range to be read at main scanning after prescanning. Although the setting unit 2 and the display unit 5 are separate units in the case of FIG. 1, these units may be configured by a single unit, such as a liquid-crystal touch panel or the like, having the setting function of the setting unit 2 and the display function of the display unit 5. A storage unit for storing control programs and a storage unit for storing data set by the setting unit 2 may be separately provided instead of providing the single storage unit 4.

Figure 6:
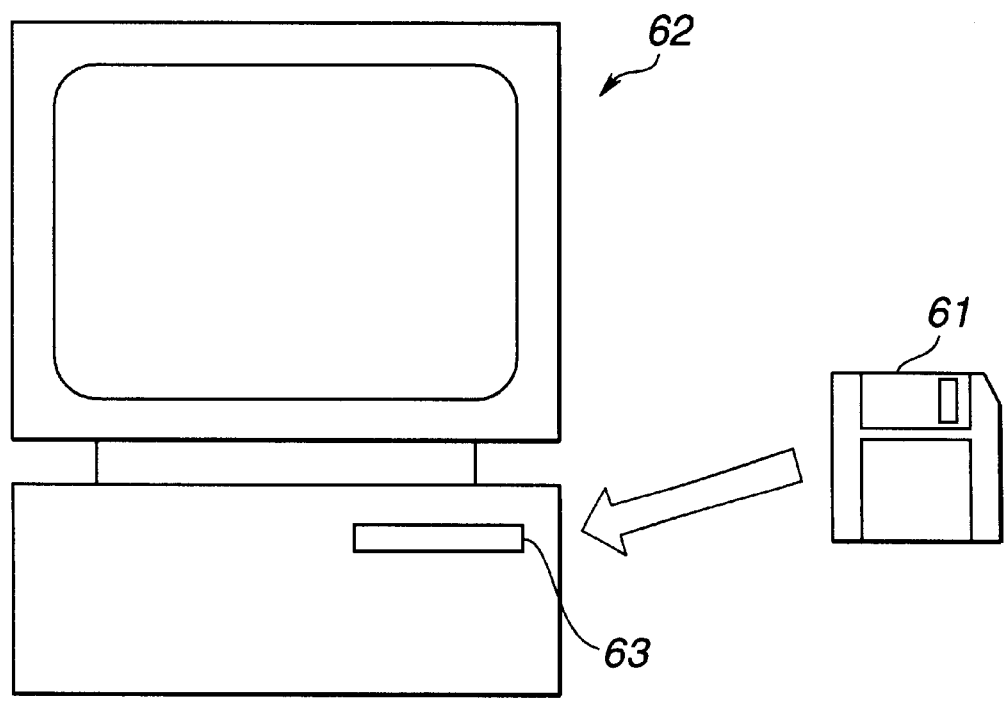
FIG. 6 is a schematic diagram illustrating a concept in which a program and related data are supplied from a storage medium to a computer.
Figure 7A:
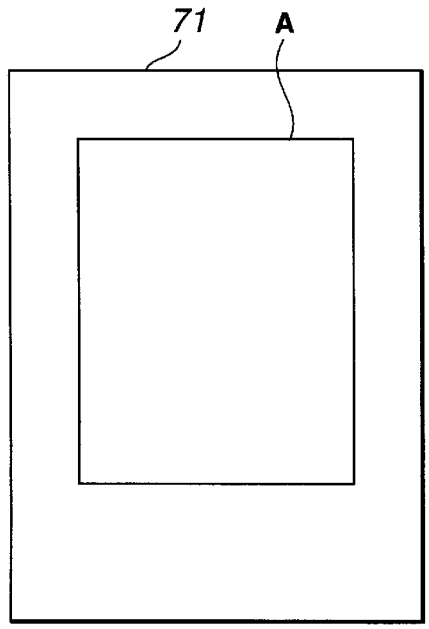
FIGS. 7A–7D are diagrams, each illustrating an operation of reading an original in a conventional image reading device.
Figure 7B:
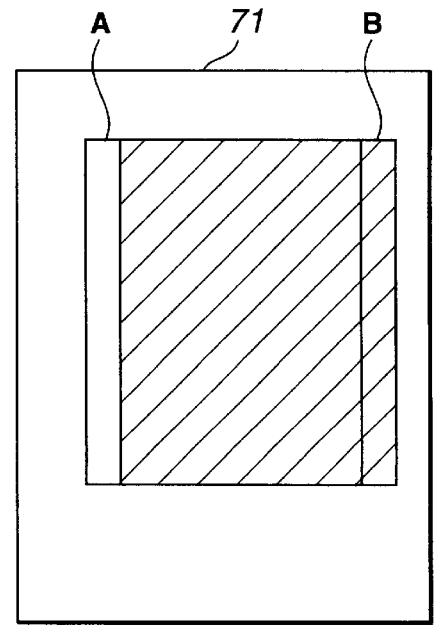
Figure 7C:
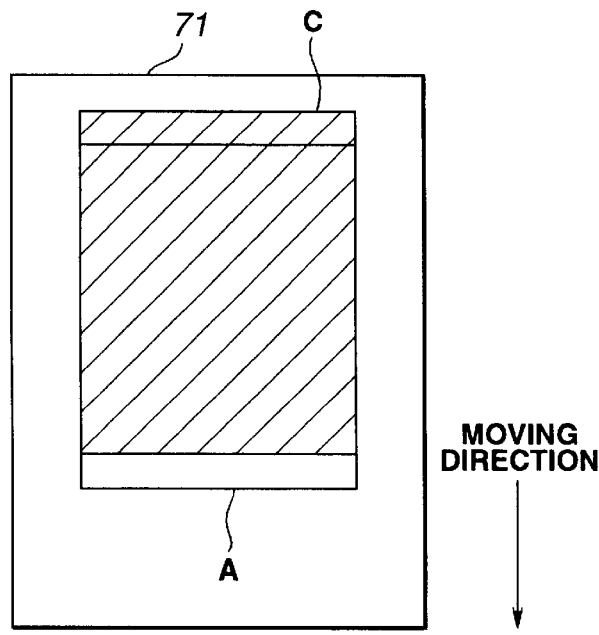
Figure 7D:
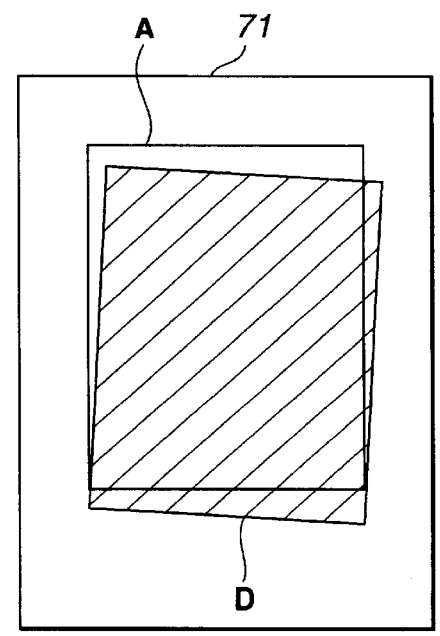

FIG. 6 is a schematic diagram illustrating a concept in which a program and related data of the present invention are supplied from a storage medium to a computer. The program and related data of the invention are supplied by inserting a storage medium 61, such as a floppy disk, a CD(compact disc)-ROM(read-only memory) or the like, into an insertion port 63 of a storage-medium drive mounted in a computer 62. By first installing the program and related data of the invention from the storage medium 61 into a hard disk, the program can be executed by loading it from the hard disk into a RAM (random access memory). It is also possible to execute the program by loading it directly from the floppy disk or the CD-ROM into the RAM instead of installing the program into the hard disk.

As described above, in the first embodiment of the present invention, as well as in a second embodiment to be described later, by supplying the program and related data of the invention read from the storage medium 61 into the computer 62 to the image reading device of the first or second embodiment, image reading control described below is realized. It is also possible to execute the program by directly supplying the program and related data to the image reading device of the first or second embodiment.

Figure 5:
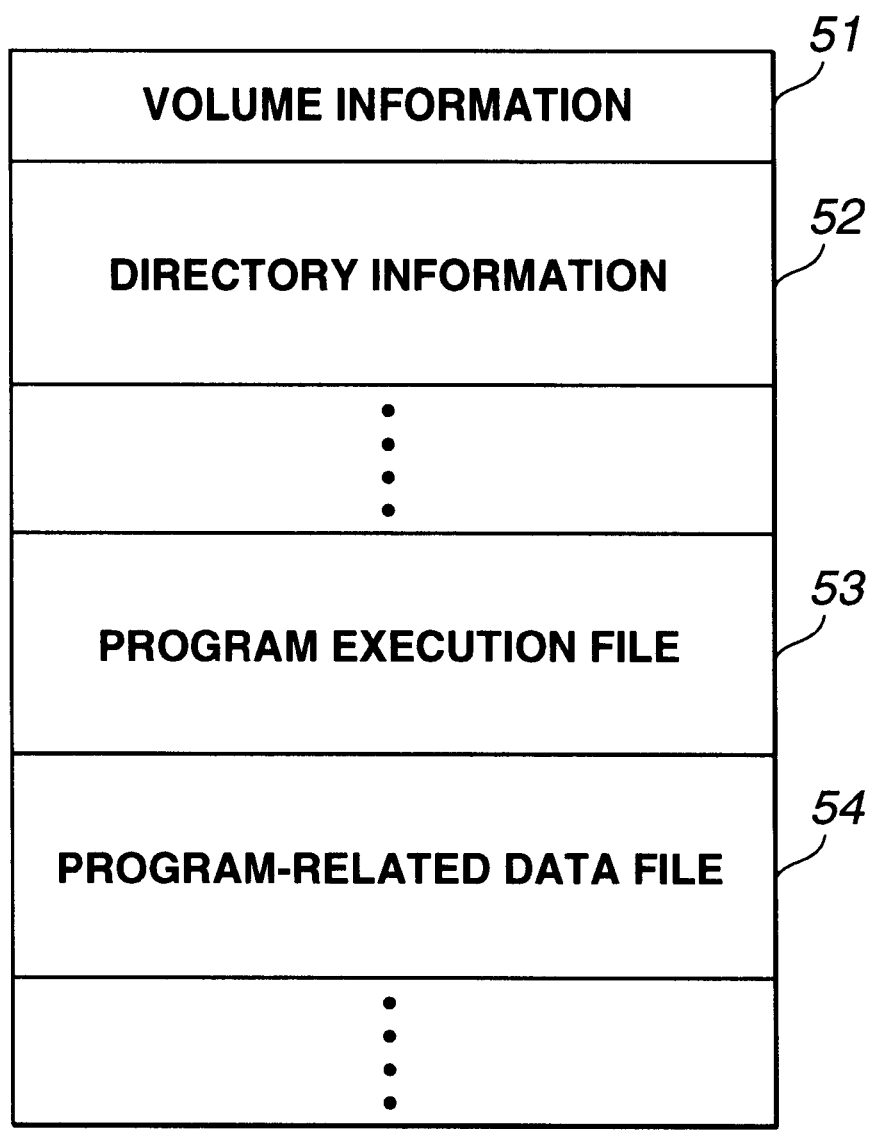
FIG. 5 is a diagram illustrating an example of the configuration of contents stored in a storage medium storing a program and related data according to the present invention.

FIG. 5 is a diagram illustrating an example of the configuration of stored contents of a storage medium storing the program and related data of the invention. The stored contents comprise, for example, volume information 51, directory information 52, a program execution file 53, a program-related data file 54 and the like. The stored contents of the storage medium shown in FIG. 5 represent only an example, and are not limited to those shown in FIG. 5.

Figure 2:
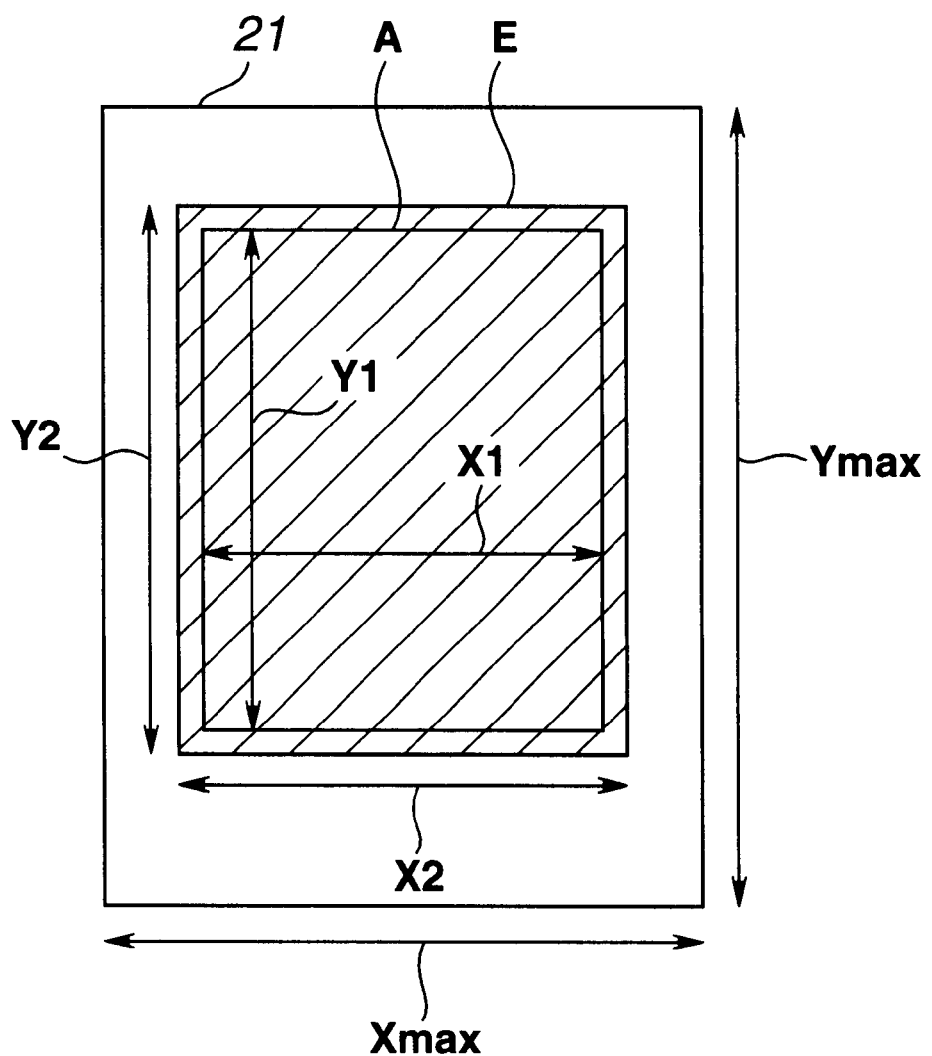
FIG. 2 is a diagram illustrating an example of reading of an original in the image reading device shown in FIG. 1.

FIG. 2 is a diagram illustrating an example of reading of an original in the image reading device according to the first or second embodiment. In FIG. 2, reference numeral 21 represents an original. An area A indicates a reading range assigned through the setting unit 2 after prescanning, and has a width X1 and a length Y1. An area E represents a range actually read by the image reading unit 3, where X2 is the width of a reading range of a scanner head (not shown) constituting the image reading unit 3 in the driving direction of the scanner head, and Y2 is the width of the reading range of the scanner head in the driving direction of the original 21, i.e., the longitudinal direction.

FIG. 3 is a table illustrating a case in which, in the image reading device of the first embodiment, the range (X2, Y2) of the area E read by the image reading unit 3 at main scanning is widened by respective predetermined widths, i.e., m in the lateral direction, and n in the longitudinal direction, from the set range (X1, Y1) of the area A.

The relationship between the range (X1, Y1) of the area A and the range (X2, Y2) of the area E is expressed by the following equations:

(1) When X2, Y2<respective maximum reading widths $X2 = X1 + m$ $Y2 = Y1 + n,$ where m and n are constants.

(2) When X2, Y2>the respective maximum reading widths $X2 = X\mathrm{max}$ $Y2 = Y\mathrm{max},$ where Xmax and Ymax are the maximum reading widths.

In the image reading device of the first embodiment, by reading an original in the above-described manner and then segmenting a necessary image range by selecting it with an image editing function, the necessary image can easily be read, and it is unnecessary to read the image again after a misreading operation has occurred as would be the case in the conventional approach.

As described above, the image reading device of the first embodiment includes the control unit 1 for controlling the image reading unit 3 so as to perform a reading operation within a range obtained by adding predetermined widths m and n to a reading range set by the setting unit 2 after prescanning so that the relationship of X2=X1+m, and Y2=Y1+n (m and n are constants) holds, where X1 and Y1 are the lengths of the reading range in the x-axis and y-axis directions, and X2 and Y2 are the lengths of an actual reading range in the x-axis and y-axis directions, respectively, and, when the lengths X2 and Y2 of the actual reading range in the x-axis and y-axis directions, respectively, exceed the corresponding maximum reading widths of the image reading unit 3, to perform a reading operation with the respective maximum reading widths, at main scanning based on a control program stored in the storage unit 4, the setting unit 2 for setting the reading range by the image reading unit 3, the image reading unit 3 for reading an image from an original, the storage unit 4 for storing control programs to be executed by the control unit 1, and data set by the setting unit 2, and the display unit 5 capable of displaying the reading range and assigning a range to be read at main scanning after prescanning. Hence, the following functions and effects are obtained.

In the above-described configuration, the control unit 1 of the image reading device controls the reading operation of the image reading unit 3 so as to perform a reading operation within a range obtained by adding predetermined widths m and n to a reading range set by the setting unit 2 after prescanning so that the relationship of X2=X1+m, and Y2=Y1+n holds, where X1 and Y1 are the lengths of the set reading range in the x-axis and y-axis directions, and X2 and Y2 are the lengths of an actual reading range in the x-axis and y-axis directions, respectively, at main scanning. The control unit 1 also controls the reading operation of the image reading unit 3 so that, when the lengths X2 and Y2 of an actual reading range in the x-axis and y-axis directions, respectively, exceed the corresponding maximum reading widths of the image reading unit 3, a reading operation is performed with the respective maximum reading widths. That is, by receiving an image within a range obtained by adding respective predetermined widths to a range to be read at main scanning assigned after prescanning when actually performing the main scanning, an original within the assigned range is assuredly received.

As a result, the first embodiment makes it possible to solve problems that occur in the conventional approach such that, for example, main scanning must be again performed more than once because an image of an original within an assigned reading range could not be correctly read, or the original must be read more than once by reassigning the reading range, due, for example, to misalignment in the set position of the original between prescanning and main scanning, slip of the original during driving of the original by the original-driving system of the image reading device, or movement of the original within the original-holder, and to improve the ease of use of the device.

The first embodiment also has the effect that, when actually performing main scanning, by appropriately selecting a range to be expanded when receiving an image within a range wider than a range at main scanning assigned after prescanning, i.e., by performing a reading operation within a range obtained by adding predetermined widths to a set reading range, it is possible to prevent problems such that, for example, a long reading time is required, and a memory for storing a received image is unnecessarily consumed.

Second Embodiment

As in the above-described first embodiment, an image reading device according to a second embodiment of the present invention has a prescanning function and a main scanning function, and includes a control unit 1, a setting unit 2, an image reading unit 3, a storage unit 4, and a display unit 5 (see FIG. 1). In FIG. 1, other components, such as an original-driving system for driving an original, an image-data storage system for storing image data read from the original, an image processing system for processing the image data read from the original, and the like, are omitted.

In FIG. 1, the control unit 1 controls the image reading unit 3 so as to perform a reading operation within a range obtained by widening a reading range set by the setting unit 2 after prescanning by predetermined ratios p and q so that the relationship of X2=X1×(1+p) and Y2=Y1×(1+q) holds at main scanning, where p and q are constants, X1 and Y1 are the lengths of the set reading range in the x-axis and y-axis directions, and X2 and Y2 are the lengths of an actual reading range in the x-axis and y-axis directions, respectively, at main scanning based on a control program stored in the storage unit 4. The control unit 1 also controls the image reading unit 3 so as to perform a reading operation with respective maximum reading widths when the lengths X2 and Y2 exceed the corresponding maximum reading widths of the image reading unit 3. The predetermined ratios p and q are set to values smaller than 1.

The setting unit 2 is operated when setting the reading range by the image reading unit 3. The image reading unit 3 reads an image from an original. The storage unit 4 stores control programs to be executed by the control unit 1, and data set by the setting unit 2. The display unit 5 can display the reading range, and can assign a range to be read at main scanning after prescanning. Although the setting unit 2 and the display unit 5 are separate units in the case of FIG. 1, these units may be configured by a single unit, such as a liquid-crystal touch panel or the like, having the setting function of the setting unit 2 and the display function of the display unit 5. A storage unit for storing control programs and a storage unit for storing data set by the setting unit 2 may be separately provided instead of providing the storage unit 4.

FIG. 4 is a table illustrating a case in which, in the image reading device of the second embodiment, the range (X2, Y2) of the area E read by the image reading unit 3 at main scanning is widened by respective predetermined ratios, i.e., p in the lateral direction, and q in the longitudinal direction, from the set range (X1, Y1) of the area A.

The relationship between the range (X1, Y1) of the area A and the range (X2, Y2) of the area E is expressed by the following equations:

(1) When X2, Y2<respective maximum reading widths $X2 = X1 \times (1+p)$ $Y2 = Y1 \times (1+q),$ where p and q are numerals less than 1.

(2) When X2, Y2>the respective maximum reading width $X2 = X\text{max}$ $Y2 = Y\text{max},$ where Xmax and Ymax are the maximum reading widths.

In the image reading device of the second embodiment, by reading an original in the above-described manner and then segmenting a necessary image range by selecting it with an image editing function, a necessary image can be read easily, and it is unnecessary to read the image again after a misreading operation has occurred, as would be the case in the conventional approach.

As described above, the image reading device of the second embodiment includes the control unit 1 for controlling the image reading unit 3 so as to perform a reading operation within a range obtained by widening a reading range set by the setting unit 2 after prescanning by respective predetermined ratios so that the relationship of $X2=X1\times(1+p)$, and $Y2=Y1\times(1+q)$ (p and q are constants) holds, where X1 and Y1 are the lengths of the reading range in the x-axis and y-axis directions, and X2 and Y2 are the lengths of an actual reading range in the x-axis and y-axis directions, respectively, and, when the lengths X2 and Y2 of the actual reading range in the x-axis and y-axis directions, respectively, exceed the corresponding maximum reading widths of the image reading unit 3, to perform a reading operation with the respective maximum reading widths, in main scanning based on a control program stored in the storage unit 4, the setting unit 2 for setting the reading range by the image reading unit 3, the image reading unit 3 for reading an image from an original, the storage unit 4 for storing control programs to be executed by the control unit 1, and data set by the setting unit 2, and the display unit 5 capable of displaying the reading range and assigning a range to be read at main scanning after prescanning. Hence, the following functions and effects are obtained.

In the above-described configuration, the control unit 1 of the image reading device controls the reading operation of the image reading unit 3 so as to perform a reading operation within a range obtained by widening a reading range set by the setting unit 2 after prescanning by predetermined ratios p and q so that the relationship of $X2=X1\times(1+p)$, and $Y2=Y1\times(1+q)$ holds, where X1 and Y1 are the lengths of the set reading range in the x-axis and y-axis directions, and X2 and Y2 are the lengths of an actual reading range in the x-axis and y-axis directions, respectively, at main scanning. The control unit 1 also controls the reading operation of the image reading unit 3 so that, when the lengths X2 and Y2 of an actual reading range in the x-axis and y-axis directions, respectively, exceed the corresponding maximum reading widths of the image reading unit 3, a reading operation is performed with the respective maximum reading widths. That is, by receiving an image within a range obtained by widening a range to be read at main scanning assigned after prescanning by respective predetermined ratios when actually performing the main scanning, an original within the assigned range is assuredly received.

As a result, the second embodiment makes it possible to solve problems in the conventional approach such that, for example, main scanning must be performed again because an image of an original within an assigned reading range could not be correctly read, or the original must be read again by reassigning the reading range, due, for example, to misalignment in the set position of the original between prescanning and main scanning, slip of the original during driving of the original by the original-driving system of the image reading device, or movement of the original within the original-holder, and to improve the ease of use of the device.

The second embodiment also has the effect that, when actually performing main scanning, by appropriately selecting a range to be expanded when receiving an image within a range wider than a range at main scanning assigned after prescanning, i.e., by performing a reading operation within a range obtained by widening a set reading range by respective predetermined ratios, it is possible to prevent problems such that, for example, a long reading time is required, and a memory for storing a received image is unnecessarily consumed.

The present invention may be applied to a system comprising a plurality of apparatuses or to an apparatus comprising a single unit. The object of the present invention may, of course, also be achieved by supplying a system or an apparatus with a storage medium storing program codes of software for realizing the functions of the above-described embodiments, and reading and executing the program codes stored in the storage medium by means of a computer (or a CPU (central processing unit) or an MPU (microprocessor unit)) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD-ROM, a CD-R (recordable), a magnetic tape, a nonvolatile memory card, a ROM or the like may be used as the storage medium for supplying the program codes.

The present invention may, of course, be applied not only to a case in which the functions of the above-described embodiments are realized by executing program codes read from a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

The individual components shown in outline or designated by blocks in the drawings are all well known in the image reading device arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading device having a prescanning function of reading an original in advance and a main scanning function of again reading the original after prescanning, said device comprising:

control means for performing control so as to perform, at main scanning, a reading operation within a second reading range wider than a first reading range set after prescanning;

image reading means for reading an image from the original; and setting means for setting the first reading range, wherein said control means controls said image reading means so as to perform, at main scanning, the reading operation within the second reading range.

2. An image reading device according to claim 1, wherein said control means controls said image reading means so as to perform, at main scanning, the reading operation such that the second reading range is wider than the first reading range by respective predetermined widths in lateral and longitudinal directions.

3. An image reading device according to claim 2, wherein said control means controls said image reading means so that the second reading range is obtained by adding predetermined widths m and n to the first reading range such that the relationship of $X2=X1+m$ and $Y2=Y1+n$ holds at main scanning, where m and n are constants, X1 and Y1 are lengths of the first reading range in the x-axis and y-axis directions, and X2 and Y2 are lengths of the second reading range in the x-axis and y-axis directions, respectively.

4. An image reading device according to claim 3, wherein the predetermined widths m and n have values smaller than the lengths X1 and Y1, respectively.

5. An image reading device according to claim 1, wherein said control means controls said image reading means so as to perform the reading operation such that the second reading range is wider than the first reading range by respective predetermined ratios.

6. An image reading device according to claim 5, wherein said control means controls said image reading means so that the second reading range is obtained by widening the first reading range by predetermined ratios p and q so that the relationship of X2=X1×(1+p) and Y2=Y1×(1+q) holds at main scanning, where p and q are constants, X1 and Y1 are lengths of the first reading range in the x-axis and y-axis directions, and X2 and Y2 are lengths of the second reading range in the x-axis and y-axis directions, respectively.

7. An image reading device according to claim 6, wherein the predetermined ratios p and q have values smaller than 1.

8. An image reading device according to any one of claims 3–7, wherein said control means controls said image reading means so as to perform the reading operation with respective maximum reading widths of said image reading device when the lengths X2 and Y2 exceed corresponding maximum reading widths.

9. An image reading device according to claim 1, wherein said device is applicable to a sheet feeding scanner which performs a reading operation by moving an original to be read.

10. An image reading device according to claim 1, wherein said device is applicable to a scanner which accommodates an original to be read within an original-holder and performs a reading operation together with the original-holder.

11. An image reading device according to claim 1, further comprising display means operable to display a current reading range, and to assign a range to be read at main scanning after prescanning.

12. An image reading method applied to an image reading device having a prescanning function of reading an original in advance and a main scanning function of again reading the original after prescanning, said method comprising:

a control step of performing control so as to perform, at main scanning, a reading operation within a second reading range wider than a first reading range set after prescanning;

an image reading step of reading an image from the original; and a setting step of setting the first reading range, wherein, in said control step, a reading operation in said image reading step is controlled so as to perform, at main scanning, the reading operation within the second reading range.

13. An image reading method according to claim 12, wherein, in said control step, the reading operation in said image reading step is controlled so as to perform, at main scanning, the reading operation such that the second reading range is wider than the first reading range by respective predetermined widths in lateral and longitudinal directions.

14. An image reading method according to claim 13, wherein, in said control step, a reading operation in said image reading step is controlled so the second reading range is obtained by adding predetermined widths m and n to the first reading range such that the relationship of X2=X1+m and Y2=Y1+n holds at main scanning, where m and n are constants, X1 and Y1 are lengths of the first reading range in the x-axis and y-axis directions, and X2 and Y2 are lengths of the second actual reading range in the x-axis and y-axis directions, respectively.

15. An image reading method according to claim 14, wherein the predetermined widths m and n have values smaller than the lengths X1 and Y1, respectively.

16. An image reading method according to claim 12, wherein, in said control step, a reading operation in said image reading step is controlled so as to perform the reading operation within a range wider than the reading range set after prescanning in said setting step by respective predetermined ratios.

17. An image reading method according to claim 16, wherein, in said control step, a reading operation in said image reading step is controlled so that the second reading range is obtained by widening the first reading range by predetermined ratios p and q so that the relationship of X2=X1×(1+p) and Y2=Y1×(1+q) holds at main scanning, where p and q are constants, X1 and Y1 are lengths of the first reading range in the x-axis and y-axis directions, and X2 and Y2 are lengths of the second reading range in the x-axis and y-axis directions, respectively.

18. An image reading method according to claim 17, wherein the predetermined ratios p and q have values smaller than 1.

19. An image reading method according to any of claims 14–18, wherein, in said control step, a reading operation in said image reading step is controlled so as to perform the reading operation with respective maximum reading widths in said image reading step when the lengths X2 and Y2 exceed corresponding maximum reading widths.

20. An image reading method according to claim 12, wherein said method is applicable to a sheet feeding scanner which performs a reading operation by moving an original to be read.

21. An image reading method according to claim 12, wherein said method is applicable to a scanner which accommodates an original to be read within an original-holder and performs a reading operation together with the original-holder.

22. An image reading method according to claim 12, further comprising a display step of displaying a current reading range, and assigning a range to be read at main scanning after prescanning.

23. A storage medium, capable of being read by a computer, storing a program for executing an image reading method applied to an image reading device having a prescanning function of reading an original in advance and a main scanning function of again reading the original after prescanning, said method comprising:

a control step of performing control so as to perform, at main scanning, a reading operation within a second reading range wider than a first reading range set after prescanning;

an image reading step of reading an image from the original; and a setting step of setting the first reading range, wherein, in said control step, a reading operation in said image reading step is controlled so as to perform, at main scanning, the reading operation within the second reading range.

* * * * *